(12) United States Patent
Fujita

(10) Patent No.: US 7,972,737 B2
(45) Date of Patent: Jul. 5, 2011

(54) FUEL CELL

(75) Inventor: Nobuo Fujita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 512 days.

(21) Appl. No.: 12/083,540

(22) PCT Filed: Nov. 15, 2006

(86) PCT No.: PCT/IB2006/003225
§ 371 (c)(1),
(2), (4) Date: Apr. 14, 2008

(87) PCT Pub. No.: WO2007/060511
PCT Pub. Date: May 31, 2007

(65) Prior Publication Data
US 2009/0162711 A1    Jun. 25, 2009

(30) Foreign Application Priority Data

Nov. 24, 2005  (JP) ................................. 2005-339270

(51) Int. Cl.
*H01M 8/04* (2006.01)
*H01M 8/24* (2006.01)

(52) U.S. Cl. ....................................... 429/432; 429/471

(58) Field of Classification Search .................. 429/432, 429/471
See application file for complete search history.

(56) References Cited

U.S. PATENT DOCUMENTS

| 6,387,556 | B1 | 5/2002 | Fuglevand et al. |
| 7,087,327 | B2* | 8/2006 | Pearson .................... 429/471 X |
| 2003/0044668 | A1 | 3/2003 | Sugita et al. |
| 2005/0142407 | A1 | 6/2005 | Fuller et al. |

FOREIGN PATENT DOCUMENTS

| CN | 1567621 A | 1/2005 |
| EP | 1 471 590 A1 | 10/2004 |
| JP | 61-225773 A | 10/1986 |
| JP | 2005-183047 A | 7/2005 |
| WO | WO 00/02283 A1 | 1/2000 |

* cited by examiner

*Primary Examiner* — Stephen J. Kalafut
(74) *Attorney, Agent, or Firm* — Kenyon & Kenyon LLP

(57) ABSTRACT

In a fuel cell which includes a plurality of stacks in which a plurality of cells, which cause reaction gases to undergo electrochemical reaction and generate electricity, are stacked in layers; and an electrically conductive member which electrically connects together end portions of the stacks, so that the stacks constitute a series circuit, there is also provided a first relay which electrically connects together some cell other than one at an end portion of a stack, and a cell of another stack. This first relay can create a bypass for cutting out a cell whose cell voltage value has become less than or equal to a predetermined value from the series circuit of the fuel cell.

9 Claims, 3 Drawing Sheets

FUEL CELL

This is a 371 national phase application of PCT/IB2006/003225 filed 15 Nov. 2006, claiming priority to Japanese Patent Application No. 2005-339270 filed 24 Nov. 2005, the contents of which are incorporated herein by reference.

BACKGROUND OF THE INVENTION

1. Field of the Invention

The present invention relates to a fuel cell. In more detail, the present invention relates to a control technique during generation of electricity by a fuel cell which includes a plurality of stacks.

2. Description of the Related Art

With a fuel cell stack (in this specification, simply termed a "stack") consisting of a plurality of cells stacked in layers, there is a tendency, in particular during starting, for rise of temperature to be delayed, the closer a cell is to the end portions of the stack. In this type of case, as a result of a state of oxygen shortage occurring at that site or the like, there is a fear that the output of the stack as a whole will decrease. In order to avoid a state in which the output decreases in this manner, there has been proposed a technique in which, for example during starting or the like, the cells at the end portions are eliminated, and electricity generation is performed with the remaining cells (for example, refer to Japanese Patent Application Publication 2005-183047).

However, if a plurality of such stacks are provided, since a method is adopted of flowing electric current through the cells at the end portions of the stacks in order to electrically connect them together, accordingly output decrease for the stack as a whole cannot be eliminated with this structure just as it is.

SUMMARY OF THE INVENTION

The object of the present invention is to provide a fuel cell which can perform stable operation by suppressing decrease of its output during starting or the like, even though it consists of a plurality of connected stacks.

The present inventor has performed various investigations, and has arrived at knowledge of a technique for effectively suppressing decrease of the output, regardless of the state of the stacks.

One aspect of the present invention is a fuel cell including a plurality of stacks in which a plurality of cells, which cause reaction gases to undergo electrochemical reaction and generate electricity, are stacked in layers; and an electrically conductive member which electrically connects together end portions of the stacks, so that the stacks constitute a series circuit; and moreover including a first relay which electrically connects together some cell other than one at an end portion of a stack, and a cell of another stack.

According to this aspect of the present invention, on the one hand, when the output is not decreased, none of the cells in the stacks are eliminated, and it is possible to perform electricity generation in a state in which the cells are all connected in a series circuit; but, on the other hand, when it is perceived that the output has decreased, then, by closing the first relay, it is possible to establish a state in which the cells of one stack other than those at the end portion thereof (hereinafter termed the interior cells) and the interior cells of another stack are connected together. Since, when an interior cell of one stack and an interior cell of another stack have been connected together in this manner, it becomes possible to perform generation of electricity in a state in which the cells whose output has decreased, which are positioned more towards the end portions than these cells which have been connected together, are eliminated, in other words are cut out, accordingly it is possible to ensure the output of the stacks as a whole.

The first relay may form a bypass for cutting out those cells of which the cell voltage value has become less than or equal to a predetermined value from the series circuit of the fuel cell. The first relay which has closed as described above can form a bypass in which there is substantially no electrical resistance between the interior cell of one of the stacks and the interior cell of the other one of the stacks. When this type of bypass has been formed, it is possible to cut out the cells which are positioned more towards the end portions of the stacks than these cells which have been connected, so that a state is established in which they do not participate in the generation of electricity.

Furthermore, a plurality of these first relays may be provided in parallel, so as to be capable of varying the number of the cells which are cut out from the series circuit. Since, when the one among this plurality of relays provided in parallel which is positioned more towards the center of the stack is closed, it is possible to establish a state in which more of the cells are cut out and do not participate in the generation of electricity, accordingly there is, for example, the beneficial aspect that it is possible to respond to the fact that the output of a large number of the cells has decreased. Furthermore there is the beneficial aspect that, in the circumstance that the output of a plurality of the cells recovers in order, it is possible to cut out only those cells whose output has not yet recovered by changing over the bypass in order by changing the relay which is closed.

The electrically conductive member may be constituted as a second relay which is provided separately from the first relay. Since in this case, just as with the first relay, it becomes possible to open and close the circuit with the electrically conductive member, therefore it is possible to change over the second relay according to the state of generation of electricity by each of the cells, or according to the output of the fuel cell, and thus to make electrically conductive, or to cut off, each of the end portions of the stacks.

It would also be acceptable to arrange, during starting, to disconnect the second relay and to connect the first relay. It is normal that, during starting, the temperatures of the cells have not reached a sufficiently high temperature level, and since moreover there is a tendency for the temperature rise of a cell to be delayed more, the closer to the end portion of its stack it is. By closing a predetermined one of the first relays and thus making a connection during starting as in the aspect of the present invention, it is possible to ensure an appropriate output for the stack as a whole by cutting out the cells which are in a low temperature state in this manner. So, it is possible to implement stabilized starting.

It would also be acceptable to arrange, when the cell voltage has recovered to the predetermined value, to disconnect the first relay, and to connect the second relay. Since, when the first relay has been opened and disconnected in this manner, a situation is established in which, so to speak, the cells which have recovered have returned to the circuit, accordingly it becomes possible to perform proper operation, i.e. operation under normal circumstances.

Furthermore, along with the plurality of stacks being arrayed in a row in a direction which is orthogonal to the direction in which the cells are stacked, the positive electrodes and the negative electrodes in the stacks may be arranged alternatingly in opposite directions. If, as in the aspect of the present invention, the plurality of stacks are arranged in a row, and moreover the positive electrodes and the negative electrodes in a stack are arrayed so as to be oriented alternatingly in opposite directions, then it becomes possible to arrange the connection points which connect between the stacks in positions which are mutually adjacent, so that a compact circuit structure becomes possible.

According to the aspect of the present invention, it becomes possible to perform operation in a stabilized manner by suppressing decrease of the output upon starting, even in a case in which a plurality of stacks are built into a connected structure.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
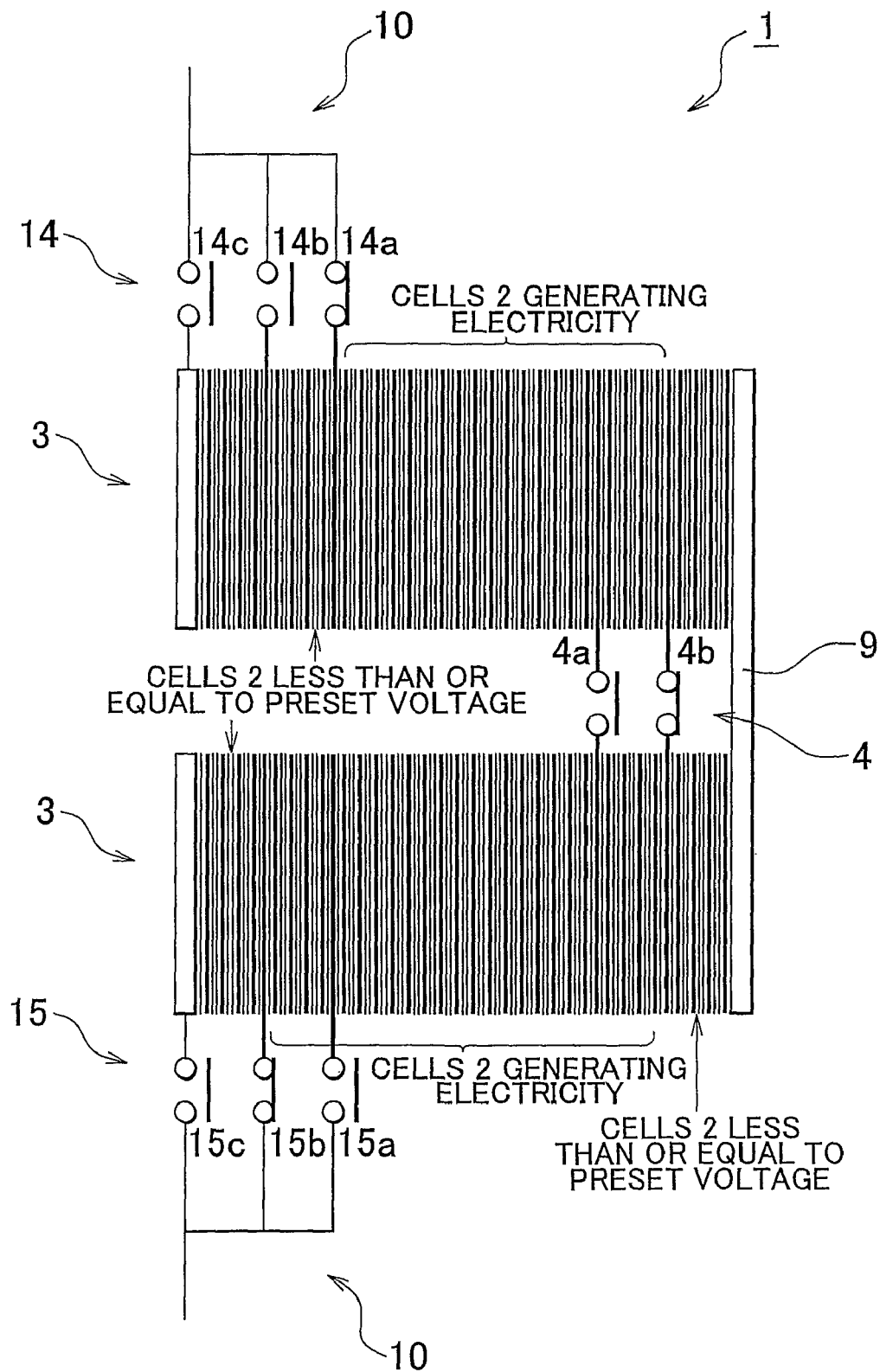
FIG. 1 is a figure schematically showing the structure of a fuel cell according to an embodiment of the present invention.

In the following, the structure of the present invention will be explained in detail, based upon an exemplary embodiment shown in the drawings.

Figure 2:
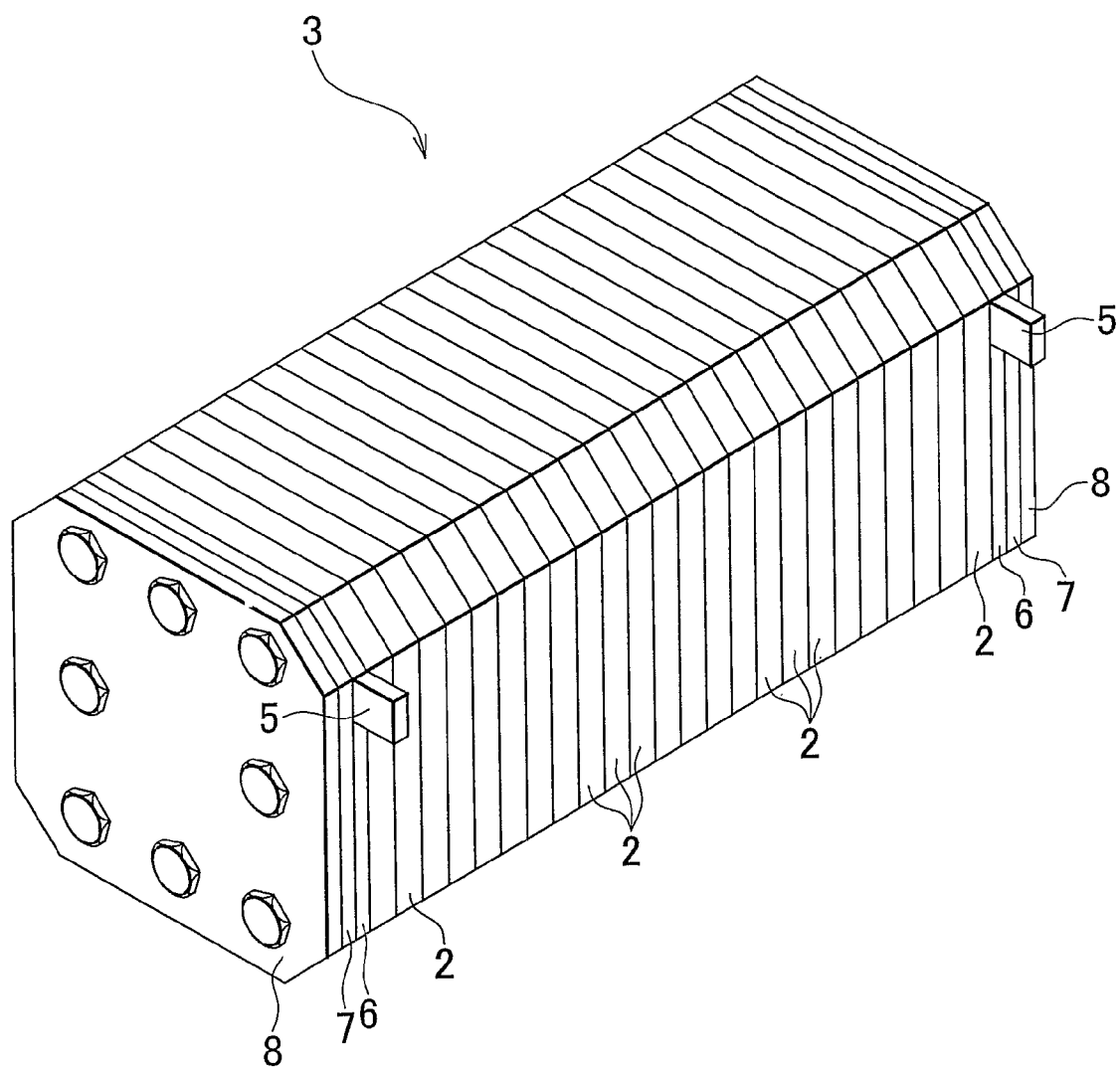
FIG. 2 is a perspective view showing an example of the structure of one stack which makes up the fuel cell.
Figure 3:
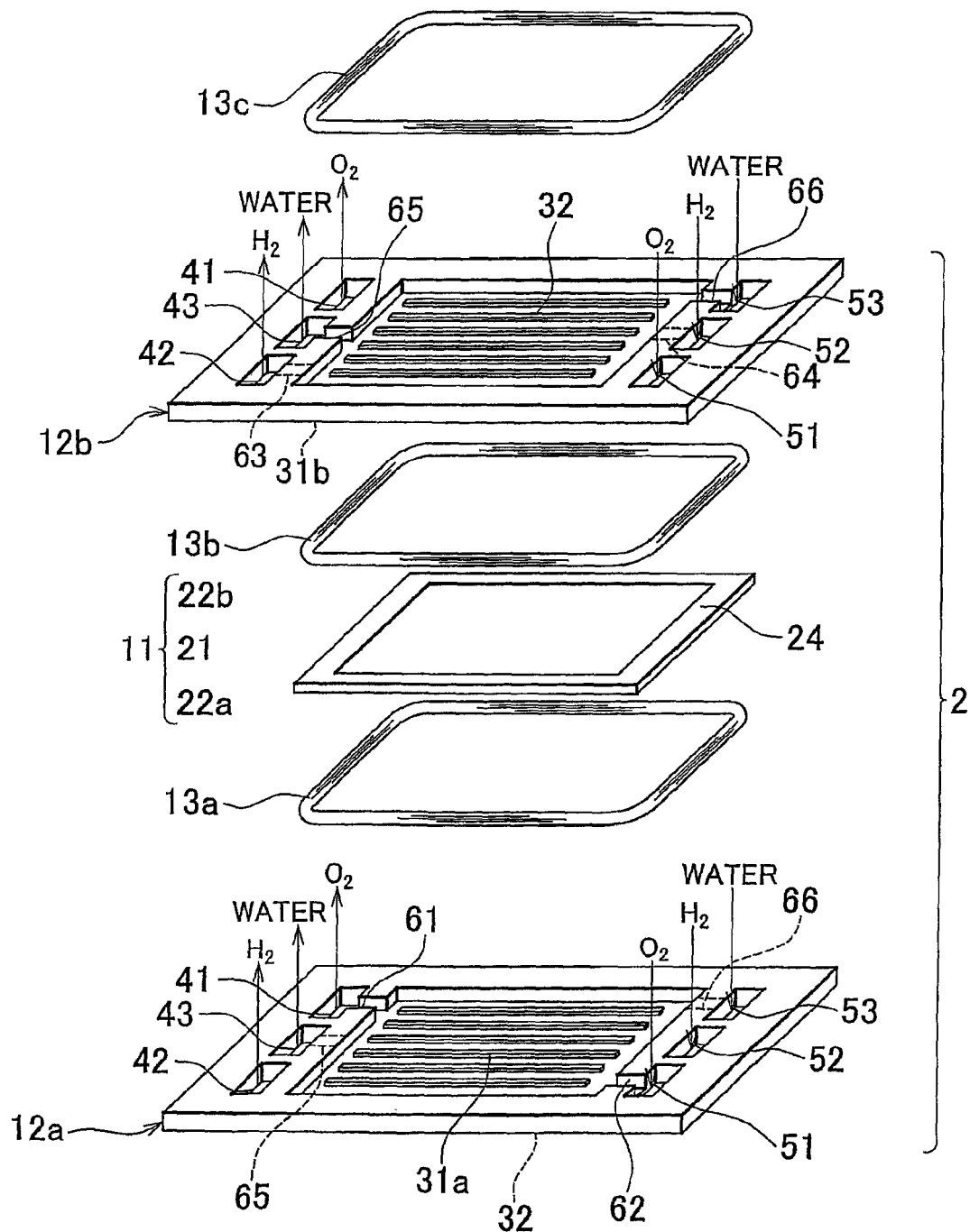
FIG. 3 is a dismantled perspective view showing a single cell of the fuel cell shown in FIG. 2 as dismantled.

FIGS. 1 through 3 show an embodiment of the fuel cell according to the present invention. The fuel cell 1 of this embodiment is one which comprises a plurality of fuel cell stacks 3 (in this specification, simply termed "stacks"). Its structure is one in which these stacks 3 are connected as a circuit in series, by the end portions of the stacks 3 being electrically connected together one to another. Furthermore, to this fuel cell 1, there is provided a relay 4 for connecting together interior cells 2 of one of the stacks 3 and interior cells 2 of another one of the stacks 3.

In the following explanation of this embodiment, first the schematic structure of one of the stacks 3 which make up the fuel cell 1 will be explained, and thereafter a fuel cell 1 which is made up of a plurality (for example, two) of these stacks 3 will be explained.

In FIGS. 2 and 3, there are shown the schematic structure of the fuel cell 1 of this embodiment. FIG. 2 shows a stack 3 which is made up by layering together cells 2, and FIG. 3 shows one of these cells 2. It should be understood that, while this fuel cell 1 which is made up from the stacks 3 in this manner is one which can be utilized as an onboard electric power generation system for, for example, a fuel cell vehicle (FCHV: Fuel Cell Hybrid Vehicle), this is not limitative of its applicability; it could also be used as an electric power generation system mounted in a mobile unit of various types (for example a ship or an aircraft or the like) or a robot or the like which is capable of self propulsion, or as a stationary fuel cell.

The fuel cell 1 comprises stacks 3 in which a plurality of cells 2 are stacked in layers, and they have a structure in which, in order at the outer side of each of the cells 2, 2 which are positioned at the two ends of each stack 3, there are disposed a collector plate 6 with an output terminal 5 affixed, an insulation plate 7, and an end plate 8. Furthermore, the fuel cell 1 is kept in a state in which a predetermined compression force is applied in the direction of stacking of its cells 2 by, for example, tension plates (not shown in the figures) which are provided so as to bridge across between the two end plates 8,8 being fixed by bolts or the like to the end plates 8, 8.

Furthermore, a cell monitor (not shown in the figures) is provided to the stack 3, for measuring the voltage of the cells 2 in order to monitor and control the operational state of the fuel cell 1. Control of the output and the like of the fuel cell 1 is performed, based upon the results of this voltage measurement. It should be understood that, although two of the collector plates 6 with output terminals 5 affixed are shown by way of example in FIG. 2, further, in order to perform voltage monitoring by this type of cell monitor, other output terminals (and collector plates) may be provided in advance at a predetermined plurality of spots along the direction in which the cells are stacked, and it may be arranged to change over between these other output terminals while monitoring the cell voltages.

The cell 2 comprises a membrane electrode assembly 11 (hereinafter termed an "MEA"—Membrane Electrode Assembly), and a pair of separators 12a, 12b which sandwich the MEA 11 (refer to FIG. 3). The MEA 11 and the separators 12a, 12b are formed in approximately rectangular plate shapes. Furthermore, the MEA 11 is formed so that its external shape is slightly smaller than the external shapes of the separators 12a, 12b. Moreover, the MEA 11 and the separators 12a, 12b are molded from molding resin, along with first seal members 13a, 13b between them around their peripheral portions.

The MEA 11 consists of a electrolytic membrane 21 made from a macromolecular material which constitutes an ion exchange layer, and a pair of electrodes 22a, 22b (a cathode and an anode) which sandwich the electrolytic membrane 21 on both the surfaces thereof. Among these, the electrolytic membrane 21 is formed so as to be slightly bigger than the electrodes 22a, 22b. The electrodes 22a, 22b are joined to this electrolytic membrane 21, for example by a hot press method, in such a way that its peripheral edge portion 24 remains protruding.

The electrodes 22a, 22b which make up the MEA 11 are made, for example, from a porous carbon material (a diffusion layer), bearing a catalyst such as platinum or the like adhered to its surface. An oxidant gas such as air or an oxidizer or the like is supplied to one of these electrodes 22a (the cathode), while hydrogen gas is supplied as a fuel gas to the other of these electrodes 22b (the anode); and, due to these two types of gas, an electrochemical reaction occurs within the MEA 11, so that an electromotive force is obtained from the cell 2.

The separators 12a, 12b are made from a gas impermeable electrically conductive material. As such an electrically conductive material, apart from carbon or a hard resin which is electrically conductive, there may be cited a metal such as aluminum or stainless steel or the like. The backing material of the separators 12a, 12b of this embodiment is one which is formed from metal plate, and a layer (for example a surface layer made by gold plating) which has excellent resistance to corrosion is formed upon the electrode side surface of this backing.

Furthermore, on both surfaces of the separators 12a, 12b, there are formed groove shaped flow conduits which consist of a plurality of concave portions. In the case of, for example, the separators 12a, 12b of this embodiment, in which the backing is formed from metal plate, these flow conduits may be formed by press forming. The groove shaped flow conduits formed in this manner constitute gas flow conduits 31a for the oxidant gas, gas flow conduits 31b for the hydrogen gas, or cooling water flow conduits 32. To explain this in more concrete terms, on the surface on the inside of the separator 12a which will become the side of the electrode 22a, there are formed a plurality of gas flow conduits 31a for the oxidant gas which are straight in shape, and on its rear surface (its surface on the outside), there are formed a plurality of cooling water flow conduits 32 which are straight in shape (refer to FIG. 3). In the same manner, on the surface on the inside of the separator 12b which will become the side of the electrode 22b, there are formed a plurality of gas flow conduits 31b for the hydrogen gas which are straight in shape, and on its rear surface (its surface on the outside), in the same manner, there are formed a plurality of cooling water flow conduits 32 which are straight in shape (refer to FIG. 3). For example, in the case of this embodiment, these gas flow conduits 31a and gas flow conduits 31b of the cell 2 are formed so as to be mutually parallel. Moreover, in this embodiment, the construction is one in which, in relation to two adjacent ones of the cells 2, 2, when the outer surface of the separator 12a of one of the cells 2 and the separator 12b of the cell 2 adjacent thereto are brought together, the cooling water flow conduits 32 of both of them become unified, and form flow conduits having, for example, a rectangular cross section. It should be understood that it is arranged to mold the peripheral portions between the separator 12a and the separator 12b of the adjacent cells 2, 2 from molding resin. Moreover, it should be understood that although, in the above explanation, straight shaped conduits were described as one example, it would also be acceptable to form these flow conduits for gas and so on in a serpentine form.

Furthermore, in the vicinity of end portions of the separators 12a, 12b (in the case of this embodiment, portions thereof near to ends thereof in the longitudinal direction) there are formed an inlet side manifold 41 for the oxidant gas, an inlet side manifold 42 for the hydrogen gas, and an inlet side manifold 43 for the cooling water. For example, in the case of this embodiment, these manifolds 41, 42, and 43 are formed as approximately rectangular through holes which are provided in the separators 12a, 12b (refer to FIG. 3). Moreover, in the end portions of the separators 12a, 12b on the opposite sides, there are formed an outlet side manifold 51 for the oxidant gas, an outlet side manifold 52 for the hydrogen gas, and an outlet side manifold 53 for the cooling water. In the case of this embodiment, these manifolds 51, 52, and 53 are also formed as approximately rectangular through holes (refer to FIG. 3).

Among these manifolds as described above, the manifold 41 and the manifold 51 for the oxidant gas in the separator 12a are communicated with the gas flow conduits 31a for the oxidant gas, via an inlet side communication passage 61 and an outlet side communication passage 62 which are formed as groove shapes in the separator 12a respectively. In the same manner, the manifold 42 and the manifold 52 for the hydrogen gas in the separator 12b are communicated with the gas flow conduits 31b for the hydrogen gas, via an inlet side communication passage 63 and an outlet side communication flow conduit 64 which are formed as groove shapes in the separator 12b respectively (refer to FIG. 3). Furthermore, the manifold 43 and the manifold 53 for the cooling water in the separators 12a, 12b are communicated with the cooling water flow conduits 32, via an inlet side communication passage 65 and an outlet side communication flow conduit 66 which are formed as groove shapes in the separators 12a, 12b, respectively. With the structure of the separators 12a, 12b as explained above, it is made possible for oxidant gas, hydrogen gas, and cooling water to be supplied to the cell 2. To cite a concrete example of this, for example, the oxidant gas is flowed into the gas flow conduits 31a from the manifold 41 of the separator 12a while passing through the communication passage 61, and, after having been used for electricity generation by the MEA 11, flows out into the manifold 51 while passing through the communication passage 62.

The first seal members 13a, 13b are members which are both formed in the same frame shape (refer to FIG. 3). Among these, the first seal member 13a is one which is provided between the MEA 11 and the separator 12a; in more detail, it is provided so as to be interposed between the peripheral edge portion 24 of the electrolytic membrane 21, and a portion of the periphery of the gas flow conduit 31a on the separator 12a. Furthermore, the other first seal member 13b is one which is provided between the MEA 11 and the separator 12b; in more detail, it is provided so as to be interposed between the peripheral edge portion 24 of the electrolytic membrane 21, and a portion of the periphery of the gas flow conduit 31b on the separator 12b.

Furthermore, between the two separators 12a and 12b of adjacent cells 2, 2, there is provided a second seal member 13c of a frame shape (refer to FIG. 3). This second seal member 13c is a member which is provided so as to be interposed between a portion of the periphery of the cooling water flow conduits 32 of the separator 12a and a portion of the periphery of the cooling water flow conduits 32 of the separator 12b, and so as to seal between them. In this connection, in the cells 2 of this embodiment, among the various passages for fluid flow 31a, 31b, 32, 41 through 43, 51 through 53, and 61 through 66 in the separators 12a, 12b, the various manifolds for fluid flow, i.e. the inlet side manifolds 41 through 43 and the outlet side manifolds 51 through 53, constitute passages which are positioned on the outside of the first seal members 13a, 13b and the second seal members 13c (refer to FIG. 3).

Next, the fuel cell 1 of this embodiment which is constructed by connecting two of the above described type of stacks 3 together will be explained (refer to FIG. 1).

As shown in FIG. 1, the fuel cell of this embodiment is structured as an array of the two stacks 3 in a direction which is orthogonal to the direction in which the cells are stacked; in other words, it has a structure in which the two stacks 3 are, so to speak, arranged in a horizontal row. In this connection, the arrangement shown here of the stacks 3 is only one example of an appropriate arrangement, and, of course it would also be possible to employ some other format; but, if they are arranged as lined up horizontally as in this embodiment, then there is the beneficial aspect that it becomes possible to make the fuel cell 1 more compact.

The two stacks 3 which are arranged in horizontal rows in this manner have a structure in which their respective end portions—in more detail, the output terminals 5 at their one end portions (however, these are omitted in FIG. 1)—are electrically connected together by being linked together by, for example, an electrically conductive plate or the like. Furthermore, at the end portions at the opposite side to this electrically conductive member 9, respective output terminals are provided, and thereby output portions 10 for this fuel cell 1 as a whole are defined. According to the structure as above, electrically, a series circuit may be constituted (refer to FIG. 1) as a result of connecting in a cranked shape from the output portion 10 of one of the stacks to the output portion 10 of the other stack.

Furthermore, a relay 4 is provided to this fuel cell 1. This relay 4 is a device for connecting an interior cell 2 of one of the stacks to an interior cell 2 of the other stack, and it is a device which, by being closed, it creates a bypass, so as to cut out a cell 2 for which the cell voltage value has become less than or equal to a predetermined value from the series circuit of the fuel cell 1. When the relay 4 is closed in this manner and a bypass is created, it is possible to cut out the cells which are positioned more towards the end portion of the stack than the cells which have been connected by this bypass, so that a state is established in which they do not participate in the generation of electricity.

It would also be acceptable for this type of relay 4 to be disposed in a number adapted to the output decrease phenomenon of the fuel cell 1. In other words, because, during starting or the like, temperature rise of the cells 2 which are closer to the end portions of the stacks 3 is delayed and voltage decrease occurs, it would also be acceptable to implement more stabilized operation by effectively cutting out the cells 2 for which there is a fear of voltage decrease occurring in this manner. This point, in this embodiment, is that, for example two of the relays 4 are provided (in FIG. 1, denoted as 4a, 4b in order from the one in the center of the stack), so as to be in parallel with the electrically conductive member 9, and it is arranged for it to be possible to select either a state in which one of these relays 4a, 4b is closed, or a state in which both of them are open together (refer to FIG. 1).

Furthermore, if a relay 4 is provided which can selectively create a bypass in this manner, it is also acceptable to endow each of the output portions 10 with the same function. In other words, since decrease of the cell voltage of the stack 3 shows almost the same symmetric change at both end portions of the stack 3, it is acceptable to perform cutting out of the cells 2 at both end portions in the same manner. For example, in this embodiment, to the output portions 10, there are provided a plurality (for example, three each, for a total of six) of relays 14, 15 in parallel (in FIG. 1, these are respectively denoted by 14a through 14c and 15a through 15c), and it is arranged to be able to select the ones which are optimum, from among the plurality (in this case three each) of electrical current paths which are thus created in parallel, in correspondence to the output state.

It should be understood that, in this case, the electrical current paths in which the relays 14c (15c) are provided are the ones which are used during normal generation of electricity, they are connected to the end portions of the stacks 3 (for example to the output terminals thereof). Although the arrangement of the relays 14a (15a) and 14b (15b) is not particularly limited, since, as described above, symmetric changes take place at both ends of the stacks 3 during decrease of the cell voltage, it would also be acceptable to arrange to dispose these relays 14a, 14b (15a, 15b) symmetrically with the relays 4a, 4b which are used for creating the bypass described above. By doing this, when the cell voltage decreases, it becomes possible to cut out in order the same number (the same amount) of the cells 2 at each of both of the end portions, and it becomes possible to return the same number (the same amount) at each end of the cells 2 which have been cut out. In this embodiment, the relays 14a (15a) are arranged symmetrically with the relay 4a, and the relay 14b (15b) is arranged symmetrically with the relay 4b (refer to FIG. 1).

In the case of this type of fuel cell 1, upon decrease of the output, it is possible to perform the following or corresponding processing. In FIG. 1, there are shown an example, which is easy to understand although it may be different from what actually happens. As for example considering the upper side stack 3 in FIG. 1, in a case such as when the cell voltage in the region from the end portion at which the relay 14c is connected to the portion where the relay 14a is connected, and in the region from the end portion where the electrically conductive member 9 is connected to the portion where the relay 4b is connected, decreases and falls below a predetermined value, then a state is established where both the relay 4b and the relay 14a are closed (refer to FIG. 1). When this has been done, since a state is established in which the cells 2 in the vicinity of both of the end portions of the stack whose cell voltages have dropped below the predetermined value have been cut out from the portion which contributes to the generation of voltage, accordingly it becomes possible to perform more stabilized operation, even though this type of output decrease is occurring.

Furthermore, as for example considering the lower side stack 3 in FIG. 1, in a case such as when the cell voltage in the region from the end portion at which the relay 15c is connected to the portion where the relay 15b is connected, and in the region from the end portion where the electrically conductive member 9 is connected to the portion where the relay 4b is connected, decreases and falls below a predetermined value, then a state is established where both the relay 4b and the relay 15b are closed (refer to FIG. 1). When this has been done, a state is established in which the cells 2 in the vicinity of both of the end portions of the stack whose cell voltages have dropped below the predetermined value have been cut out from the portion which contributes to the generation of voltage, in the same manner as described above.

It should be understood that the electrical current path in the case of the example described above becomes: the lower side output terminal 10 in FIG. 1→the relay 15b→those among the interior cells 2 of the lower side stack whose voltage is greater than or equal to the predetermined value→the relay 4b→those among the interior cells 2 of the upper side stack 3 whose voltage is greater than or equal to the predetermined value→the relay 14a→the upper side output portion 10. In other words, at this time point, the cells which are in from the connection portion of the relay 15b to the connection portion of the relay 4b, and from the connection portion of the relay 4b to the connection portion, of the relay 14a, come to be handled as cells which contribute to the actual generation of electricity.

Furthermore, when operation is continued in the state described above, along with the passage of time, the cell voltage so to speak recovers, so as to rise above the predetermined value. When the cells 2 outwards from the center ones have gradually recovered in this manner, the system returns from the state in which these cells 2 which have recovered have been cut out to the state in which these cells 2 which have recovered returned to the original circuit, and it is possible to return the cells to a state in which they contribute to the generation of electricity. To give an example, at a time point directly after starting, for example, the relay 4a is closed, and the system switches over to the relay 4b together with the recovery state of the cell voltages (in other words, the relay 4a is put into the open state, and the relay 4b is put into the closed state), and, when recovery has continued further, finally the relay 4b also is opened, and it is possible to establish a state of normal electricity generation in which the system has switched over to the electrically conductive member 9; in other words, it is possible to switch over in order to a state in which the generation of electricity is performed using all of the cells 2.

As explained above, with the fuel cell 1 of this embodiment having the structure described above, on the one hand, if there is no decrease of output, none of the cells 2 of the stacks 3 are eliminated, and it is arranged to perform generation of electricity in a state in which the cells are all connected in series in a circuit; but, when a decrease of output is perceived, it is possible to establish a state in which, by closing the relay 4 (and 14, 15), the interior cells 2 of one of the stacks 3 and the interior cells 2 of the other stack 3 are connected by a bypass. When part way along the circuit is connected in this manner by a bypass, it becomes possible to perform the generation of electricity in a state in which the cells 2 which are positioned more towards the end portions than the cells 2 which are mutually connected have been cut out; or, to express this in different words, it becomes possible to stop the generation of electricity by the cells 2 in the vicinity of the end portions. If the cells 2 for which the temperature has not risen enough are left as they are, condensation will occur before long, and there is a fear of inviting decrease of the voltage due to this condensed water hindering the supply of the fuel. However, with the fuel cell of this embodiment, in which it is possible to cut out only predetermined ones of the cells 2 for a predetermined time period, it is possible to suppress decrease of the output due to this type of reason, so that it is possible to implement a more stable operating state.

It should be understood that, although the above described embodiment is an appropriate example of an implementation of the present invention, this is not to be considered as being limitative of the present invention; various alterations may be implemented, provided that the gist of the present invention is not departed from. For example, while in the above described embodiment the explanation was furnished in terms of the case in which several (two to three) of the relays 4 (14, 15) were provided, this is only an example; it goes without saying that, if more than this number of relays are provided, it would become possible to cut out the cells 2 one by one in more finely defined portions or regions. If this is done, it becomes possible to make the system respond more delicately in correspondence to the temperature situation or the electricity generation situation. Although, in this case, there are various modes or formats which should be implemented in concrete terms according to the specification or the output of the fuel cell 1, to cite a concrete example, if it is arranged to provide a relay 4 (14, 15) for every two or three of the stacked cells at the same interval, then it is possible to cut out these cells 2, and to reconnect them and return them to service, two or three at a time, then fine switching over becomes possible, while preventing the number of the relays from becoming too great. Moreover, it would be acceptable not necessarily to connect together cells 2 of which the distance (number in the stack) from the stack end portions is the same; or it would be acceptable, according to the state of the stacks 3, to connect together the end portion on one of the stacks 3 and a cell 2 other than one on the end portion of the other stack 3; or it would be acceptable to connect between cells 2 whose distance (number in the stack) from the end portion is different.

Furthermore, although the expression "relays" (4, 14, 15) has been used in this specification, this expression "relay" is, so to speak, used in the broad sense; for example, it also includes the use of a switch for performing switching over. The important thing is that, in this specification, it is possible to utilize as relays various types of device which can be changed over as desired between a state in which the electrical current path is cut off midway along it, and a state in which it is electrically conducting.

Furthermore although, in this embodiment, the structure was such that the end portions of the two stacks 3 were connected together by the electrically conductive member 9 (for example, a member such as an electrically conductive plate), instead of this, it would also be possible to utilize a structure in which they are connected together by employing a first relay 4, which is used at another site as well, as a substitute member (a second relay). In this case, when for example both of the above described relays 4a and 4b are open, the electrical current path is formed by closing this substitute relay (the second relay).

Furthermore although, in this embodiment, the explanation was made in terms of a system in which the present invention was applied when the cell voltage of one portion was less than or equal to a predetermined value, as a more concrete application scenario, it would also be possible to apply the present invention to a case in which the relay 4 is only closed, for example, during starting up of the fuel cell 1. For example, during starting up of the fuel cell 1, it is usual for the temperatures of the cells 2 not to have attained a sufficient level, and furthermore, in terms of the fact that, the closer a cell 2 is to the end portion of the stack, the greater is the tendency for its temperature rise to be delayed. If the present invention is applied to this type of scenario, then it becomes possible to implement stabilized starting, in which the cells 2 in a state in which their temperatures are low are cut out in this manner.

Moreover, if as described above the electrically conductive member 9 is constituted as a second relay, then it would be acceptable, during starting of the fuel cell 1, to establish a connection state in which this second relay is opened and disconnected, and the above described relay (the first relay) 4 is closed and connected. In this type of case, it becomes easy to ensure the output of the stack as a whole, since during starting the cells 2 which are positioned towards the end portions of the stacks 3 come to be cut out. Furthermore, when the cell voltage has recovered to the predetermined value, by disconnecting the first relays 4 in order, and by finally establishing a state in which the second relay is connected, it is possible to proceed to change over to a normal state of generation of electricity, in other words, to a state in which the generation of electricity is performed while using all of the cells 2. Moreover if, in this manner, operation of the fuel cell is performed in a state in which the second relay (the electrically conductive member) is opened, then, since it is possible to establish a state in which the cells 2 which are positioned towards the end portions of the stacks 3 (the cells whose output has decreased) are electrically cut out from the other cells 2, accordingly there is also the beneficial aspect that it is possible to await recovery of the cells 2 towards the end portions of the stacks, while maintaining a state of generation of electricity in which the efficiency is good.

On the other hand, for example during starting of the fuel cell 1, it is also possible to proceed with the above type of second relay (electrically conductive member) closed just as it is. In this type of case, while the efficiency of the generation of electricity becomes lower than in the state in which the second relay is in the opened state, the speed of elevation of the temperature becomes faster, than in the case in which the second relay is not electrically conductive, since it is possible to put the cells 2 towards the end portions of the stacks 3 (the cells whose output has decreased) into a state of generation of electricity. Accordingly, there is the beneficial aspect that a state of normal generation of electricity is implemented more quickly, by elevating the temperature of these cells 2 whose output has decreased. This fact is also the same in the case of the electrically conductive member 9 in the embodiment described above, for which, for example, an electrically conductive plate was used.

Furthermore, it would also be acceptable to use a heater (a heating device) for elevating the temperature of the cells 2 at the end portions of the stacks 3 (the cells whose output has decreased). If it is arranged to heat up the cells 2 at the end portions of the stacks 3 (the cells whose output has decreased) using an external heater of this type, then there is the beneficial aspect that, as a result of the fact that the speed of temperature elevation becomes quick, from starting the fuel cell 1, it is possible to implement a state of normal generation of electricity more quickly. Moreover, in this case, since, even if the generation of electricity is continued in the state in which the second relay (the electrically conductive member) is opened as previously described, this is not accompanied by very much delay in the temperature rise time, accordingly there is also the beneficial aspect that compatibility is possible between quickly implementing (returning to) normal generation of electricity, and maintaining a state of generation of electricity in which the efficiency is good.

Furthermore although, in this embodiment, a fuel cell 1 was shown by way of example which had a structure (refer to FIG. 1) in which the two stacks 3 were, so to speak, arranged in a horizontal row, this also was only cited by way of an example: the number of the stacks 3 is not limited to the case of two, and the arrangement of these stacks 3 is also not limited to the case of their being arranged in a horizontal row. The important thing is that the fuel cell is made up from a plurality of the stacks 3; and, moreover, it should be understood that it is possible to apply the present invention to any case in which the fuel cell 1 has a structure in which its plurality of stacks 3 are connected together in series in a circuit by electrically connecting together their end portions.

The invention claimed is:

1. A fuel cell, comprising:
 a plurality of stacks in which a plurality of cells, which cause reaction gases to undergo electrochemical reaction and generate electricity, are stacked in layers;
 an electrically conductive member which electrically connects together end portions of the stacks, so that the stacks constitute a series circuit;
 a first relay which electrically connects together some cell other than one at an end portion of a stack, and a cell other than one at an end portion of another stack; and
 a relay control configured to control the electrical connection of the first relay.

2. A fuel cell according to claim 1, wherein
 the first relay constitutes a bypass for cutting out a cell, which is at the end portion of the stack, from the series circuit of the fuel cell.

3. A fuel cell according to claim 2, wherein
 a plurality of the first relays are arranged in parallel, so as to be capable of changing the number of the cells which are cut out from the series circuit.

4. A fuel cell according to claim 1, wherein
 the first relay constitutes a bypass for cutting out a cell, whose cell voltage value is less than or equal to a predetermined value, from the series circuit of the fuel cell.

5. A fuel cell according to claim 4, wherein a plurality of the first relays are arranged in parallel, so as to be capable of changing the number of the cells which are cut out from the series circuit.

6. A fuel cell according to claim 1, wherein the electrically conductive member includes a second relay which is provided separately from the first relay.

7. A fuel cell according to claim 6, wherein during starting of the fuel cell, the second relay is interrupted by the relay control, and the first relay is connected by the relay control.

8. A fuel cell according to claim 6, wherein
 when the cell voltage has recovered to a predetermined value, the first relay is disconnected by the relay control, and the second relay is connected by the relay control.

9. A fuel cell according to claim 1, wherein along with the plurality of stacks being arrayed in a row in a direction which is orthogonal to the direction in which the cells are stacked, the positive electrodes and the negative electrodes of the stacks are arranged alternately in opposite directions.

\* \* \* \* \*